Patented Sept. 10, 1929.

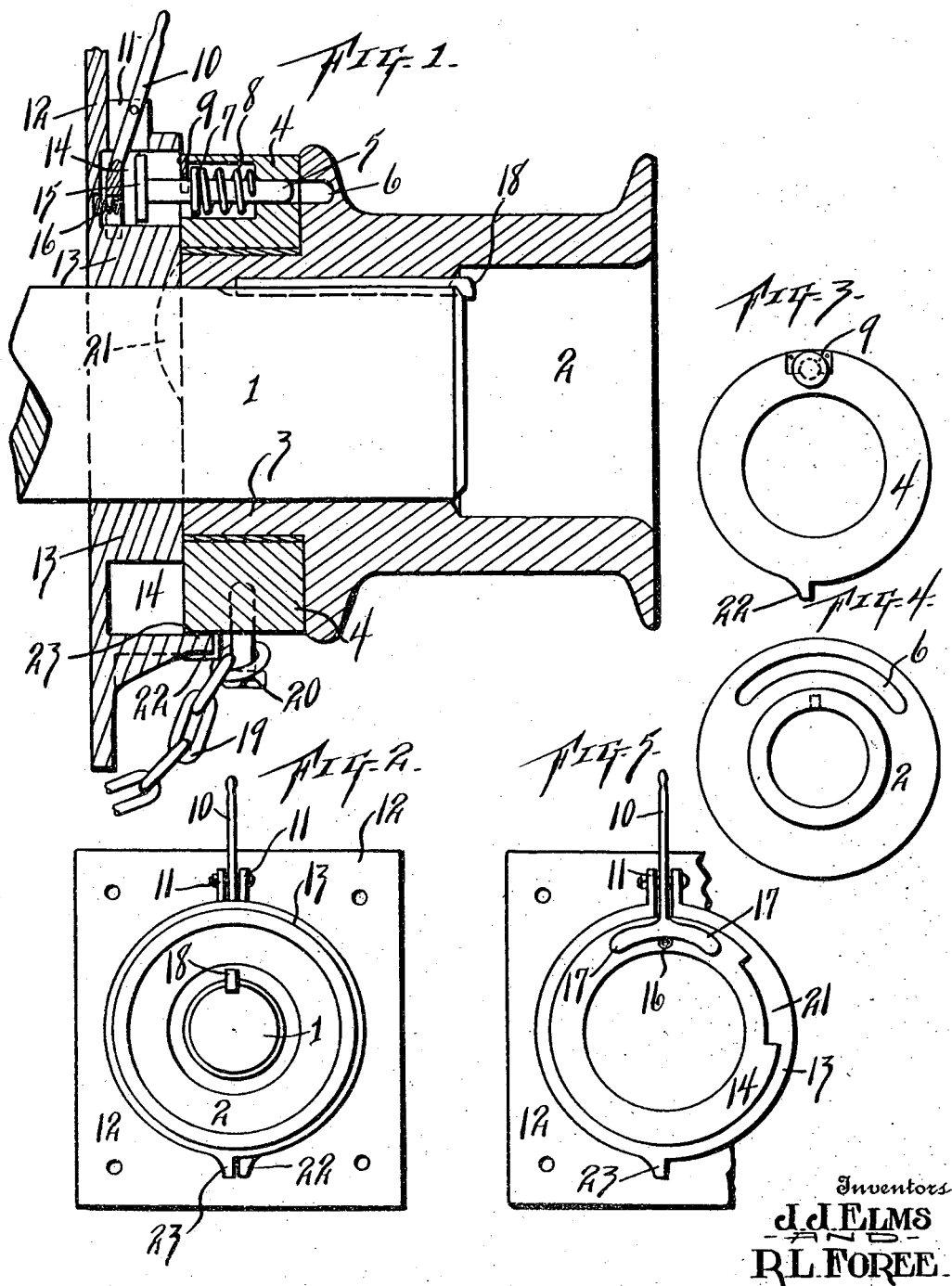

1,728,111

UNITED STATES PATENT OFFICE.

JOSEPH J. ELMS AND ROBERT L. FOREE, OF WEWOKA, OKLAHOMA.

JOINT BREAKER.

Application filed October 17, 1927. Serial No. 226,772.

Our invention relates to joint breakers and more particularly to a tool adapted for the initial starting of the breaking of a tool joint; and the object is to provide a tool for use on rotary drilling rigs which will be positive in action and which will not start until someone starts the tool when a joint is to be broken and which will be automatically released immediately after the joint is initially broken. This tool is to be mounted on the end of a line shaft and is always in place ready for action and may be thrown in mesh with the line-shaft cat-head. Other objects and advantages will be fully explained in the following description and the invention will be more particularly pointed out in the claims.

Reference is had to the accompanying drawings which form a part of this application.

Fig. 1 is a side elevation of a portion of a line shaft and a longitudinal section of a line shaft cat-head, a section of the tool drum and the pin carrying roller.

Fig. 2 is an end elevation of a line-shaft cat-head and showing the tool applied thereto.

Fig. 3 is a rear elevation of the pin-carrying roller.

Fig. 4 is a rear elevation of the cat-head.

Fig. 5 is a face view of the drum and lever carried thereby.

Similar characters of reference are used to indicate the same parts throughout the several views.

The drawings show the end 1 of a line shaft and a cat-head 2 mounted thereon and keyed on the shaft. The cat-head has a reduced portion 3 which forms a bearing or journal for the pin carrying roller 4. The roller 4 carries a locking pin 5 and this pin has an annular flange 7 which forms a seat for a spring 8. The locking pin 5 is adapted to enter a curved recess 6 in the cat-head. The recess 6 is elongated so that the pin 5 will be certain to enter the recess when thrust in that direction. The pin 5 is prevented from leaving its seat or bearing in the roller 4 by a yoke or plate 9 which is attached to the roller 4. This yoke catches behind the flange 7 and retains the pin in its seat.

A lever 10 is provided for actuating the pin 5. The lever 10 is fulcrumed in bearings 11 which are formed on the casting which forms the plate 12 which is to be attached to the jack post (not shown). A drum 13 is cast on the plate 12 and has an annular recess 14 therein for the head 15 of the pin 5. The lever 10 is held in inoperative position by a spring 16 which is attached to the plate 12 and to the inner end of the lever 10. The lever 10 is actuated to thrust the pin 5 into the recess 6. As soon as the lever is released, the spring 16 will draw the lever back to inoperative position as shown in Fig. 1. The lever 10 has laterally projecting wings 17 which engage the pin head 15. The object is to make sure or certain that the pin 5 will be thrust into the recess 6, as the recess 6 is revolving.

The pin 5 is thrust into the recess 6 for temporarily locking the roller 4 to the revolving cat-head 2 which is locked to the shaft 1 by the key 18. The joint of the drill pipe is often difficult to start. By locking the roller 4 to the revolving cat-head 2, the entire force of the line shaft is utilized to break the joint. A chain 19 is connected to the roller 4 by a bolt 20. The chain 19 is connected to the break-out tongs (not shown). As the chain is traveling with the roller, the chain will pull with a sudden tremendous force sufficient to start the breaking of the joint. Almost at the same time, the pin head 15 will strike the cam tripper 21 by which the pin will be withdrawn from the recess 6 in the cat-head 2. The roller 4 will stop turning and the weight of the chain 19 and the stop 22 will bring the roller 4 back to normal or inoperative position. A stop 23 will arrest the movement of the roller 4 when the roller stop 22 comes against the stop 23. This ends the service of the joint breaker. The workman then releases the tongs from the drill pipe. The rotary drill then goes on raising the pipe until another joint comes up high enough to be broken. Then the operation of the joint breaker starts over.

What we claim, is,—

1. Apparatus for utilizing the entire power of a revolving line shaft for breaking joints comprising a cat-head keyed to a line shaft and provided with a reduced portion and an annular shoulder adjacent thereto, said shoulder having a curved recess therein, a collar adapted to revolve on said reduced portion and a headed locking pin carried by said collar, a chain attached to said collar and to be attached to break out tongs, means for thrusting said pin into said recess to lock said collar to said cat-head for actuating said chain, a cam on the face of said shoulder for automatically withdrawing said pin from said recess immediately after said chain has been actuated, and means for automatically restoring said collar to normal position.

2. Apparatus for utilizing the entire power of a revolving line shaft for breaking joints comprising a cat-head rigid with a line shaft, a collar revolubly mounted on said cat-head, a spring actuated head pin for locking said collar to said cat-head, a chain attached to said collar and to be attached to break-out tongs, and a cam integral with said cat-head for automatically withdrawing said pin from said cat-head immediately after said chain has actuated the break-out tongs.

3. Apparatus for utilizing the entire power of a revolving line shaft for breaking joints comprising a cat-head rigid with a line shaft, a shoulder formed on said cat-head and provided with a locking recess, a collar revolubly mounted on said cat-head, a spring-actuated pin to be inserted in said recess for temporarily locking said collar to said cat-head, a chain attached to said collar and to be attached to break-out tongs, a cam carried by said cat-head for withdrawing said pin from said recess for automatically detaching said collar from said cat-head immediately after said chain has actuated the break-out tongs, means for automatically revolving said collar to normal position, and means for automatically stopping said collar at normal position.

4. Apparatus for utilizing the entire power of a line shaft for breaking joints comprising a cat-head keyed to a line shaft and provided with a reduced portion and an annular shoulder adjacent thereto, said shoulder having a curved recess therein, a collar adapted to revolve on said reduced portion and a locking pin carried by said collar, a chain attached to said collar to be attached to break-out tongs, means for thrusting said pin in said recess to lock said collar to said cat-head for actuating said chain, and means for automatically withdrawing said pin from said recess.

In testimony whereof, we set our hands, this 5th day of July, 1927.

JOSEPH J. ELMS.
R. L. FOREE.